United States Patent [19]

Kawaida et al.

[11] Patent Number: 4,484,973
[45] Date of Patent: Nov. 27, 1984

[54] PLY-TURNING DEVICE FOR USE IN TIRE-BUILDING

[75] Inventors: Shinji Kawaida, Shimonoseki; Chiaki Ozawa, Kodaira, both of Japan

[73] Assignee: Bridgestone Tire Company Limited, Tokyo, Japan

[21] Appl. No.: 560,005

[22] Filed: Dec. 9, 1983

[30] Foreign Application Priority Data

Dec. 22, 1982 [JP] Japan ................ 57-225473

[51] Int. Cl.³ .................................. B29H 17/22
[52] U.S. Cl. ................... 156/400; 156/132; 156/410; 156/413
[58] Field of Search ........... 156/398, 400, 403, 410, 156/412, 413, 414, 421, 421.4, 131, 132, 133

[56] References Cited

U.S. PATENT DOCUMENTS

| | | | |
|---|---|---|---|
| 3,232,817 | 2/1966 | Nädler et al. | 156/398 |
| 3,374,138 | 3/1968 | Porter et al. | 156/132 X |
| 3,438,832 | 4/1969 | Cantarutti | 156/132 X |
| 3,560,301 | 2/1971 | Cantarutti | 156/403 X |
| 3,676,261 | 7/1972 | Appleby et al. | 156/403 X |
| 3,772,125 | 11/1973 | Leblond | 156/400 X |

FOREIGN PATENT DOCUMENTS 37-2188  5/1962 Japan.
50-22074 7/1975 Japan.

Primary Examiner—William A. Powell
Assistant Examiner—Thomas Bokan
Attorney, Agent, or Firm—Sughrue, Mion, Zinn, Macpeak & Seas

[57] ABSTRACT

A ply-turning device for use in tire-building is disclosed herein which is adapted to turnup a surplus portion of a carcass ply around a bead core in the manufacture of large size tires each having a pair of axially protruding side portions. The device comprises a plurality of ply-turning vanes being arranged concentrically to a first drum for the formation of a green case and circumferentially in the form of a cylinder at a collapsed position and being movable from the collapsed position to an opened position of a frustoconical shape in opposition to each axially protruding side edge portion of the drum by means of link means, a hydraulically driving means moving toward and away from the drum, and a retractably moving means for moving all the ply-turning vanes together with the link means.

3 Claims, 6 Drawing Figures

FIG_3a
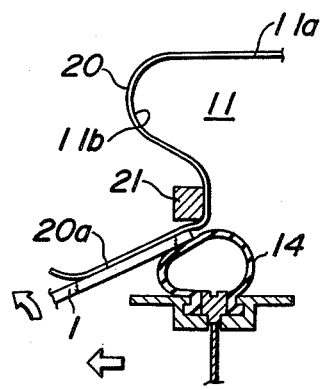
FIG_3b
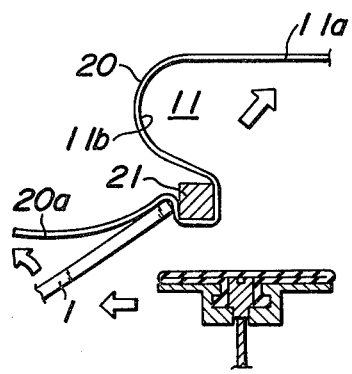
FIG_3c
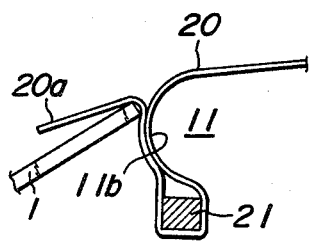
FIG_3d
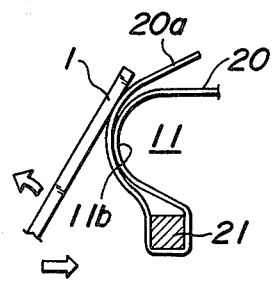

PLY-TURNING DEVICE FOR USE IN TIRE-BUILDING

BACKGROUND OF THE INVENTION (1) Field of the Invention

This invention relates to a ply-turning device for use in tire-building.

(2) Description of the Prior Art

In large size tires which are typically a so-called off-the-road tire (OR tire) predominantly used on rough ground under a heavy loading, each of the bead portions is often required to be reinforced with a plurality of bead cores, for example, two or three bead cores arranged adjacent to each other in a direction parallel to the rotational axis of the tire. In any case, a first drum for the formation of a first green case to be used at the initial building stage of such a large size tire protrudes axially and outward in a radial direction at both side edge portions. Therefore, when a surplus portion of a carcass ply is wound around a bead core located inward at each of the protruding side edge portions and turned upward in the radial direction, it is difficult to intimately join the surplus turnup portion to the carcass ply along the protruding side edge portion of the drum.

For this reason, it has hitherto been proposed a method wherein the surplus portion of the carcass ply is wound around the bead core and turned upward by using a toroidal bladder capable of expanding in the radial direction near each side edge portion of the first drum (See, for instance, Japanese Patent Application Publication Nos. 36-434 and 45-27,467). In this method, however, there are some serious drawbacks that the expansion stroke of the bladder along the protruding side edge portion is too long, the expansion resistance conspicuously increases due to the protruding, it is difficult to completely join the end of the surplus portion to the carcass ply at a final stage, and the large diameter of the bladder itself often causing puncture is dangerous in the workability, i.e. in view of the maintenance of safety in the factory.

SUMMARY OF THE INVENTION

It is, therefore, an object of the invention to advantageously overcome the aforementioned drawbacks of the prior art, and to provide a ply-turning device for use in tire-building in which an appropriate contact pressure is applied to the surplus portion of the carcass ply along each of the protruding side edge portions of the first drum with top portions of a plurality of ply-turning vanes adapted to open into a frustoconical shape in opposition to the side edge portion of the drum, whereby a first green case for a large size tire can efficiently be formed with safety.

According to the invention, a ply-turning device for use in tire-building comprises a plurality of ply-turning vanes for turning upward a surplus portion of a ply for carcass around each of bead cores, said surplus portion of the carcass ply placed on an outer circumferential surface of a first cylindrical drum for the formation of a first green case being bent radially inward along each of axially protruding side edge portions of said first drum and said bead core being arranged outside said carcass ply and inward of said axially protruding side edge portion in axial and radial directions; said all ply-turning vanes being arranged concentrically to said first drum and circumferentially in the form of a cylinder having a diameter slightly smaller than that of said bead core at a collapsed position and being movable from said collapsed position to an opened position of a frustoconical shape in opposition to said side edge portion of said first drum by means of link means each including intermediate and rear link members; and further comprising a hydraulically driving means whose movable member is connected to an end of said rear link member and moved toward and away from said first drum in parallel with an axis of said first drum, and a retractably moving means for moving said all ply-turning vanes together with said link means in parallel with the axis of said first drum.

According to the invention, each surplus portion of the carcass ply can advantageously be forced to the carcass ply along the axially protruding side end portion of the first drum without applying an excessive external force by the opening movement of all top portions of the ply-turning vanes (i.e. the increase of conical angle) through the link means and the retractable movement of the ply-turning vanes together with the link means.

BRIEF DESCRIPTION OF THE DRAWINGS

The invention will be described in detail with reference to the accompanying drawings, wherein:

FIGS. 3a to 3d are a flow diagram illustrating various stages of the ply-turning operation, respectively.

DETAILED DESCRIPTION OF THE INVENTION

Figure 1:
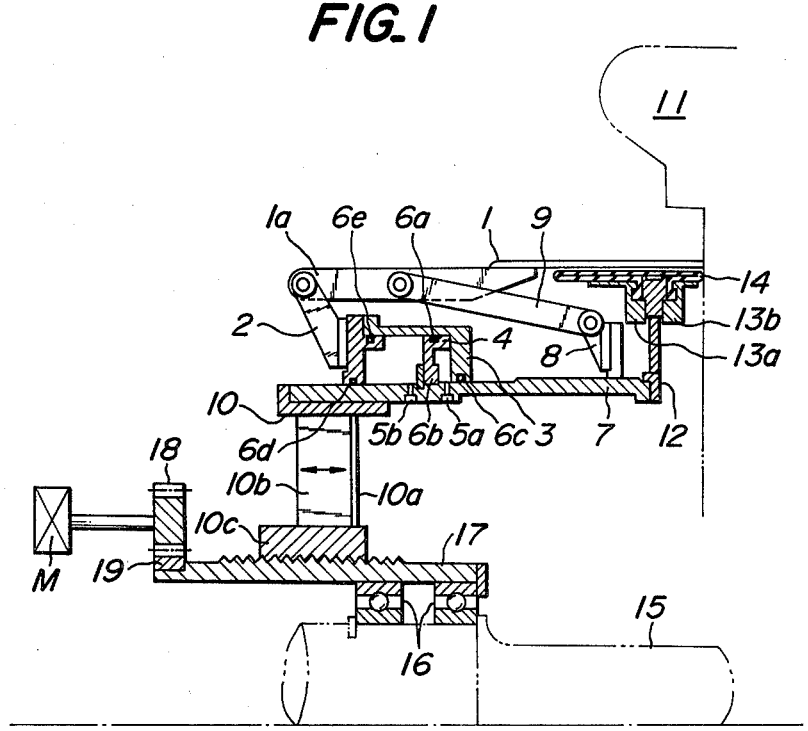
FIG. 1 is a sectional view in principal part of an embodiment of the ply-turning device according to the invention.

In FIG. 1 is illustrated an embodiment of the ply-turning device for use in a large size tire-building according to the invention, wherein numeral 1 is a ply-turning vane, numeral 2 a rear link member, numeral 3 a movable cylinder securing one end of the rear link member thereto, numeral 4 a fixed partition wall housed in the cylinder 3, numerals 5a and 5b fluid supply-discharge holes, numerals 6a–6e O-rings, numeral 7 a slide sleeve fixing the partition wall thereon, numeral 8 a bracket fixed on the side sleeve, numeral 9 an intermediate link member fixed at its one end to the bracket 8, numeral 10 a supporting cylinder for the slide sleeve 7, numeral 10a a web, numeral 10b a reinforcing rib, numeral 10c a base, and numeral 11 a first drum.

Figure 2:
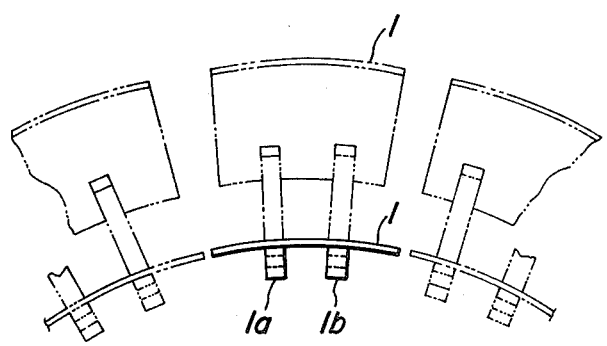
FIG. 2 is a partial front view of ply-turning vanes.

As shown in FIG. 2, each of the ply-turning vanes 1 corresponds to a divided segment of the cylinder at the collapsed position, and is a sixteenth-divided segment in the illustrated embodiment. At the inside surface at one end of each vane 1 a pair of movable arms 1a and 1b are welded, each being pivotably connected to the other ends of the rear and intermediate link members 2, 9 through pins in place, as shown in FIG. 1.

It is preferable that a support disc 12 be attached at its one end to the end portion of the slide sleeve 7 near the first drum 11, and an inflatable bladder 14 of a relatively small diameter be provided at the other end portion of the support disc 12 along the inside surfaces of the ply-turning vanes 1 by means of a pair of support rings 13a and 13b. In this case, the bladder 14 serves to promote the initial opening movement of the ply-turning vane 1 in the inflation of the bladder. Moreover, numeral 15 is a rotary shaft to which the first drum 11 is fitted therearound. Onto the rotary shaft 15 is rotatably supported a screw sleeve 17 through bearings 16, which is operatively connected to a motor M through gears 18 and 19 for controlling the retractable movement of the supporting cylinder 10 based on the rotation of the screw sleeve 17.

As shown in FIG. 3a, a ply 20 for carcass is first placed on an outer circumferential surface 11a of the first drum 11, which each surplus side portion 20a thereof is bent radially inward along each of axially protruding side edge portions 11b of the first drum 11. And a bead core 21 is arranged outside the ply 20 and inward of the side edge portion 11b in axial and radial directions. Thereafter, the ply-turning vane 1 is slightly opened by the inflation of the bladder 14 to urge toward the bottom surface of the bead core 21 and at the same time, a fluid such as a compressed air is introduced into the inside of the cylinder 3 through a supply hole 5a to advance the cylinder 3 in the right-hand direction in FIGS. 1 and 3, whereby the vane 1 is further opened to push the surplus portions 20a onto the bead core 21.

Next, the screw sleeve 17 is rotated through the gears 18 and 19 by the driving of the motor M to slightly retract the supporting cylinder 10 together with the slide sleeve 7 fixed thereto and all the ply-turning vanes 1 in the left-hand direction in FIGS. 1 and 3. Then, as shown in FIG. 3b, the surplus portion 20a is turned around the bead core 21 while forcing thereto under the successive opening of the ply-turning vanes 1. Further, as shown in FIG. 3c, the top portions of the ply-turning vanes are moved along the axially protruding side surface edge portion 11b of the first drum 11 by adjusting the movement of the slide sleeve 7. Finally, as shown in FIG. 3d, the top portions of the ply-turning vanes 1 ride over the utmost protruding position of the side edge portion 11b to completely forge the surplus portion 20a onto the ply 20.

Thereafter, the slide sleeve 7 is once moved to the utmost retracted position, and then returned to the original operating position as shown in FIG. 1 by releasing the pressure of the fluid introduced into the cylinder 3 through the supply hole 5a. Then, the carcass ply-turning operation can be carried out with respect to the subsequent ply or bead core (not shown) in the same manner as described above.

In the above embodiment, pressure is applied into the supply hole 5a, so that it is required to connect the discharge hole 5b to a certain back-pressure source. Instead of this a single driving system may be used in which a spring is housed in one part defined by the cylinder 3 and the partition 4. Alternatively, a double driving system may be used in which the supply and discharge of the fluid are alternately switched to the holes 5a and 5b. Instead of the partition 4 fixed to the slide sleeve 7, a telescopically movable hollow piston may be used, wherein a rod of the piston is projected from one end of the cylinder 3 and its end is pivotably connected to the intermediate link member 9 through a pin.

As mentioned above, according to the invention, an appropriate force for forcing the surplus portion of the carcass ply to the ply can be obtained along the so-called protrusion profile of the carcass ply by the opening movement of the ply-turning vanes while following the above profile at the time of turning upward the surplus portion of the carcass ply around the bead core along the protrusion profile, in the case that if it is intended to manufacture a large size tire having plural pairs of bead core such as two or three pairs of bead cores, each side edge portion of a green case for the tire axially protrudes from the first drum as the side edge portion goes apart from the bead core. Thus, the green case of this type can safely and efficiently be formed without causing the incomplete joining of the surplus portion or puncture failure when using the conventional large size bladder.

What is claimed is:

1. A ply-turning device for use in tire-building comprising a plurality of ply-turning vanes for turning upward a surplus portion of a ply for carcass around each of bead cores, said surplus portion of the carcass ply placed on an outer circumferential surface of a first cylindrical drum for the formation of a first green case being bent radially inward along each of axially protruding side edge portions of said first drum and said bead core being arranged outside said carcass ply and inward of said axially protruding side edge portion in axial and radial direction; said all ply-turning vanes being arranged concentrically to said first drum and circumferentially in the form of a cylinder having a diameter slightly smaller than that of said bead core at a collapsed position and being movable from said collapsed position to an opened position of a frustoconical shape in opposition to said side edge portion of said first drum by means of link means each including intermediate and rear link members; and further comprising a hydraulically driving means whose movable member is connected to an end of said rear link member and moved toward and away from said first drum in parallel with an axis of said first drum, and a retractably moving means for moving said all ply-turning vanes together with said link means in parallel with the axis of said first drum.

2. A ply-turning device according to claim 1, further comprising an inflatable bladder arranged on an end of said hydraulically driving means near said first drum so as to promote the initial opening movement of said ply-turning vanes.

3. A ply-turning device according to claim 1, wherein a pair of movable arms are fixed at one end thereof to each end portion of said ply-turning vanes and pivotably connected to the ends of said intermediate and rear link members of each of said link means through pins in place.

* * * * *